United States Patent Office 3,817,822
Patented June 18, 1974

3,817,822
FIRE-RETARDANT PLYWOOD
David Haddon Dawes, Westbrook, Ontario, Canada, assignor to Du Pont of Canada Limited, Montreal, Quebec, Canada
No Drawing. Filed Jan. 22, 1973, Ser. No. 325,621
Int. Cl. B32b 27/10
U.S. Cl. 161—165                             13 Claims

ABSTRACT OF THE DISCLOSURE

A process is disclosed for producing a fire-retardant plywood which comprises at least two plies of wood sheet impregnated with a fire-retardant salt, the plies being bonded together with a polyethylene film cross-linked with an organic peroxide. The process comprises the steps of:

(1) impregnating plies of wood sheet with an aqueous solution of a fire-retardant salt;
(2) drying the salt impregnated plies of wood sheet;
(3) placing between the plies of salt impregnated wood sheet at least one thin polyethylene film in the presence of an organic peroxide cross-linking agent for the film; and
(4) heating the plies of salt impregnated wood sheet to a temperature between about 250° F. and about 350° F., under a pressure of between about 150 pounds per square inch gauge and about 250 pounds per square inch gauge and for a period of time between about 3 minutes and about 10 minutes.

---

This invention relates to fire-retardant plywood and more particularly to fire-retardant plywood having plies of salt impregnated wood sheet bonded with polyethylene film cross-linked with an organic peroxide.

In the manufacture of commercially available fire-retardant plywood, the plywood is first prepared by gluing together, usually with an urea-formaldehyde or a phenol-formaldehyde resin adhesive, plies of wood sheet. The plywood is then post treated with a fire-retardant salt solution, for example, a solution of monobasic ammonium phosphate ($NH_4H_2PO_4$) in water. This process is time consuming and expensive in that it involves two drying steps. Moreover, the surface texture and appearance of the fire-retardant plywood so produced is inferior to that of regular plywood. In view of these disadvantages in commercially available fire-retardant plywood, efforts have been made in the past to develop a process for producing fire-retardant plywood involving the impregnation of the wood sheets with salt solution followed by the gluing together of the salt impregnated wood sheets.

In Canadian Pat. No. 691,888, which issued on Aug. 4, 1964, Hyatt discloses a process for producing fire-retardant plywood which comprises first impregnating wood sheets with a fire-retardant salt, for example, monobasic ammonium phosphate, while the sheets are separate, drying the impregnated wood sheets, and forming finished plywood panels by applying heat and pressure to multiple layers of impregnated sheets having a water-insoluble or relatively water-soluble adhesive, such as exterior grade phenol-formaldehyde resin adhesive, deposited between the layers. The process of Hyatt has apparently not been adapted commercially, possibly because of difficulty in obtaining moisture-resistant adhesion between the impregnated and dried wood sheets when the usual exterior grade adhesives such as phenol-formaldehyde plywood adhesives are used. This adhesion problem may be caused by interference of the inorganic fire-retardant salt in the impregnated wood sheets with the thermosetting reaction of the adhesive.

In Canadian Pat. No. 789,517, which issued on July 9, 1968, Schick and Mahar disclose a process for making regular plywood which comprises applying heat and pressure to multiple layers of wood sheets having polyethylene film sheets coated with an organic peroxide [2,5-dimethyl-2,5-di-(t-butylperoxy)hexane] cross-linking agent between the layers. Schick and Mahar also give examples which indicate that the regular plywood produced by their method is equivalent to commercial phenol-formaldehyde bonded plywood.

Surprisingly, it has now been found that fire-retardant plywood, which tends to avoid the disadvantages of commercially available fire-retardant plywood, and which also tends to avoid the adhesion problem frequently exhibited by fire-retardant plywood produced according to the method of Hyatt, may be produced by impregnating separate wood sheets with a fire-retardant salt solution, drying the impregnated wood sheets, and subsequently forming finished plywood from the impregnated and dried sheets by the method disclosed by Schick and Mahar for making regular plywood.

In accordance with the present invention, therefore, there is provided a fire-retardant plywood comprising at least two plies of wood sheet impregnated with a fire-retardant salt, the plies being bonded together with polyethylene film cross-linked with an organic peroxide.

One embodiment provides a process for producing a fire-retardant plywood comprising (1) impregnating plies of wood sheet with an aqueous solution of a fire-retardant salt;
(2) drying the salt impregnated plies of wood sheet;
(3) placing between the plies of salt impregnated wood sheet at least one thin polyethylene film in the presence of an organic peroxide cross-linking agent for the film; and
(4) heating the plies of salt impregnated wood sheet at a temperature between about 250° F. and about 350° F., under a pressure of between about 150 pounds per square inch gauge and about 250 pounds per square inch gauge and for a period of time between about 3 minutes and about 10 minutes.

Various fire-retardant salt solutions may be used to impregnate the wood sheets used to make the fire-retardant plywood of the present invention; for example aqueous solutions of monobasic ammonium phosphate and/or dibasic ammonium phosphate. Following impregnation with the fire-retardant salt, the wood sheets are dried. The dried sheets are stacked as multi-ply panels having polyethylene film coated with an organic peroxide positioned between sheets. The panels are then placed in a hot press and compressed at a predetermined pressure and temperature for a predetermined time. It will be apparent to one skilled in the art that all of these steps may be carried out in a continued process. The preferred conditions for the hot pressing step are those commonly used commercially for regular plywood and are as follows: (1) a pressure of about 200 pounds per square inch gauge; (2) a temperature of about 300° F.; and (3) a time dependent on the plywood thickness, e.g. 5 minutes for ¼ inch thick, 3-ply material.

Various grade of polyethylene film and various organic peroxides may be used in bonding together the layers of impregnated wood sheet providing the hot pressing conditions are varied. In other words, the organic peroxide may be matched with a grade of polyethylene film and with particular hot pressing conditions. The organic peroxide selected should have a half life and be present in an amount adapted to allow the following to occur: (1) the polyethylene to enter the wood sheets before an excessive amount of cross-linking of the polyethylene has occurred; and (2) the cross-linking of the polyethylene to be substantially complete in the time selected for the hot pressing step. For the preferred hot pressing conditions detailed above it is preferred that the polyethylene film be made from a polyethylene resin having a density of approximately 0.92 and a melt index in the range of 1.5 to 10 and that it be cross-linked with benzoyl peroxide present in an amount equal to about 3% of the weight of the polyethylene film. The thickness of the polyethylene film between the plies of wood sheet may be in the range of from about 1 mil to about 4 mil; the preferred thickness being 2 mil. Increasing the polyethylene film thickness from 2 mil to 4 mil between sheets does not appear to alter the degree of adhesion obtained.

The following example illustrates the present invention without limiting its scope.

EXAMPLE

Wood sheets were impregnated with an aqueous solution of monobasic ammonium phosphate and then dried. The dried sheets contained approximately 27% monobasic ammonium phosphate.

The dried wood sheets were laid up in three-ply panels. In two of the panels a conventional phenol-formaldehyde resin adhesive was used in the glue lines between the wood sheets as control tests. In other panels, films made from two polyethylene resins having different densities and melt indices were coated with a varying amount of benzoyl peroxide and positioned between the wood sheets. The panels were then placed in a hot press and compressed at about 200 pounds per square inch gauge pressure and at about 300° F. for about 5 minutes. Each of the panels was subjected to the following test:

TEST

Each 3 ply panel to be tested is cut into 1 inch by 3 inch test pieces. A saw-cut through two plies of each test piece is made 1 inch from one end and parallel thereto. Another saw-cut through two plies of each test piece is made from the opposite side, 1 inch from the other end and parallel thereto. The centre ply of each test piece is thus severed by both saw-cuts.

The slotted 1 inch x 3 inch test pieces are then placed in boiling water for 10 minutes, removed and immediately placed in iced water for 10 minutes. This procedure is repeated three times for a total of one hour. Each piece is then removed from the iced water and placed while wet with an end in each jaw of an Instron Tester, both of the saw-cuts being free of the gripping jaws. The jaws of the Instron Tester are then moved apart at a speed of 12 in./min. to pull the test piece apart.

A good indication of the strength of the bond between plies of the test piece is given by the degree of wood failure. The degree of wood failure is expressed as a value from 0 to 100% and describes the way the bond failed, i.e. at the glue line or in the wood. A 100% wood failure indicates that the adhesive system is stronger than the fibre structure of the wood.

The result of the test on each of the panels is summarized in the table below:

TABLE

A.—Polyethylene film

| Panel number | Density (gm./cc.) | Melt index (A.S.T.M. D-1238) | Gauge (mil) | Benzoyl peroxide [1] | Percent wood failure |
|---|---|---|---|---|---|
| 1 | 0.92 | 10 | 2 | 0 | [2] 0 |
| 2 | 0.92 | 10 | 2 | 3 | 79 |
| 3 | 0.92 | 10 | 4 | 3 | 64 |
| 4 | 0.92 | 4 | 2 | 3 | 64 |
| 5 | 0.915 | 1.5 | 2 | 3 | 40 |

B.—Phenol formaldehyde resin adhesive

| | | |
|---|---|---|
| 6 | 61.4 lb. of adhesive/1,000 sq. ft. of double glue line. | [2] 0 |
| 7 | 118.0 lb. of adhesive/1,000 sq. ft. of double glue line. | [2] 0 |

[1] As percent of the weight of the film.
[2] Indicates that very little bond strength remained after the test pieces had been subjected to water at temperatures alternating between 212° F. and 32° F. for a total period of one hour.

I claim:
1. A fire-retardant plywood comprising at least two plies of wood sheet impregnated with a fire-retardant salt, the plies being bonded together with polyethylene film cross-linked with an organic peroxide.
2. The fire-retardant plywood of Claim 1 wherein the organic peroxide is benzoyl peroxide.
3. The fire-retardant plywood of Claim 2 wherein the benzoyl peroxide is present in an amount equal to about 3% of the weight of the polyethylene film.
4. The fire-retardant plywood of Claim 3 wherein the polyethylene film is made from a polyethylene resin having a density of approximately 0.92 and a melt index in the range of from 1.5 to 10.
5. The fire-retardant plywood of Claim 4 wherein the thickness of the polyethylene film is in the range of from about 1 mil to about 4 mils.
6. The fire-retardant plywood of Claim 4 wherein the thickness of the polyethylene film is 2 mils.
7. The fire-retardant plywood of Claim 4 wherein the fire-retardant salt is monobasic ammonium phosphate.
8. The fire-retardant plywood of Claim 5 wherein the fire-retardant salt is monobasic ammonium phosphate.
9. The fire-retardant plywood of Claim 6 wherein the fire-retardant salt is monobasic ammonium phosphate.
10. A process for producing a fire-retardant plywood comprising in sequence the steps of:
    (1) impregnating plies of wood sheet with an aqueous solution of a fire-retardant salt;
    (2) drying the salt impregnated plies of wood sheet;
    (3) placing between the plies of salt impregnated wood sheet at least one thin polyethylene film in the presence of an organic peroxide cross-linking agent for the film; and
    (4) heating the plies of salt impregnated wood sheet at a temperature between about 250° F. and about 350° F., under a pressure of between about 150 pounds per square inch gauge and about 250 pounds per square inch gauge and for a period of time between about 3 minutes and about 10 minutes.
11. The process of Claim 10 wherein the plywood is ¼ inch thick, 3-ply and wherein the heating step is carried out at a temperature of about 300° F., under a pressure of about 200 pounds per square inch gauge, and for a time period of about 5 minutes.
12. The process of Claim 10 wherein (1) the fire-retardant salt is monobasic ammonium phosphate; (2) the polyethylene film has a density of about 0.92 and a melt index between 1.5 and 10; and (3) the organic peroxide is benzoyl peroxide and is present in an amount equal to about 3% of the weight of the film.
13. The process of Claim 11 wherein (1) the fire-retardant salt is monobasic ammonium phosphate; (2) the polyethylene film has a density of about 0.92 and a melt index between 1.5 and 10; and (3) the organic peroxide is benzoyl peroxide and is present in an amount equal to about 3% of the weight of the film.

References Cited

UNITED STATES PATENTS 3,674,596  7/1972  McMinimy _____ 161—403

FOREIGN PATENTS 691,888  8/1964  Canada _____ 161—403
789,517  7/1968  Canada _____ 161—250

WILLIAM J. VAN BALEN, Primary Examiner

U.S. Cl. X.R.

156—306, 334; 161—250, 403

PO-1050
(5/69)

UNITED STATES PATENT OFFICE
CERTIFICATE OF CORRECTION

Patent No. 3,817,822                    Dated June 18, 1974

Inventor(s) David Haddon Dawes

It is certified that error appears in the above-identified patent and that said Letters Patent are hereby corrected as shown below:

In the heading on the face of the patent, after the line reading "No Drawing. Filed Jan. 22, 1973, Ser. No. 325,621" the following information should be added:

-- Foreign Application Priority Data:
   Canada, Ser. No. 137,855, Filed March 22, 1972 --

Signed and sealed this 4th day of February 1975.

(SEAL)
Attest:

McCOY M. GIBSON JR.                C. MARSHALL DANN
Attesting Officer                  Commissioner of Patents